United States Patent

Snowden

[15] 3,657,768
[45] Apr. 25, 1972

[54] VAPORIZING TECHNIQUE FOR TREATMENT OF ANIMAL CARCASSES

[72] Inventor: Bryan T. Snowden, Grapevine, Tex.
[73] Assignee: Food Equipment, Inc., Dallas, Tex.
[22] Filed: Feb. 24, 1970
[21] Appl. No.: 13,604

Related U.S. Application Data

[63] Continuation-in-part of Ser. No. 831,964, June 10, 1969.

[52] U.S. Cl. ................................................17/11.2, 17/51
[51] Int. Cl. ..........................................................A22c 21/04
[58] Field of Search.........................17/11.2, 11, 15, 1, 51

[56] References Cited

UNITED STATES PATENTS

| | | | |
|---|---|---|---|
| 3,561,040 | 2/1971 | Floden | 17/11.2 |
| 3,178,763 | 4/1965 | Kloman | 17/1 R |
| 2,562,556 | 7/1951 | Kurt | 17/1 R X |
| 3,559,233 | 2/1971 | Bottomley et al. | 17/11 X |

FOREIGN PATENTS OR APPLICATIONS

| | | | |
|---|---|---|---|
| 1,148,932 | 4/1969 | Great Britain | 17/15 |

Primary Examiner—Lucie H. Laudenslager
Attorney—Richards, Harris & Hubbard

[57] ABSTRACT

A vaporizing spray system for treatment of slaughtered animals includes a hosing extending at a predetermined angle to the horizontal which is substantially less than 90°. An overhead conveyor extends through the housing along a predetermined path along which the slaughtered animals are carried by shackles. The path includes at least four reversing traverses between the lower end and upper end of the housing. Spray structure is supported on walls between the traverses to direct high temperature steam and water against the animals carried through the housing. The entry of ambient air into the housing is selectively controlled to create an upward draft in the housing for regulation of the internal temperature of the housing. In one embodiment of the invention, the head and feet portions of the animals are elevated above the straddle areas of the animals to thereby expose the straddle areas to the steam and/or water spray. In another embodiment of the invention, oscillating spray conduits are disposed within the housing for spraying oscillating streams of fluid or steam to treat the animals being carried therethrough. In another embodiment of the invention, line splitter structure is provided to pivot shackles hanging from the conveyor to first one and then another of two opposed inclined positions, with a spray conduit being disposed beneath the two inclined positions for alternately directing spray medium against the animal carcasses as they pass thereby.

6 Claims, 11 Drawing Figures

INVENTOR:
BRYAN T. SNOWDEN

Patented April 25, 1972

INVENTOR.
BRYAN T. SNOWDEN

Richards, Harris & Hubbard
ATTORNEYS

Patented April 25, 1972

INVENTOR:
BRYAN T. SNOWDEN

Richards, Harris, Hubbard
ATTORNEYS

INVENTOR:
BRYAN T. SNOWDEN

Richards, Harris & Hubbard
ATTORNEYS

Patented April 25, 1972

INVENTOR:
BRYAN T. SNOWDEN

Richards, Harris & Hubbard
ATTORNEYS

VAPORIZING TECHNIQUE FOR TREATMENT OF ANIMAL CARCASSES

RELATED APPLICATIONS

This application is a continuation-in-part of the copending patent application Ser. No. 831,964, entitled "Vaporizing Apparatus for Treatment of Animal Carcasses," filed by Bryan T. Snowden on June 10, 1969, and assigned to the present assignee.

FIELD OF THE INVENTION

This invention relates to treatment of animal carcasses, and more particularly to a method and system for treating fowl such as poultry to reduce or destroy surface bacteria and to loosen the feathers thereof to facilitate subsequent defeathering.

THE PRIOR ART

It has been found necessary to treat fowl in order to loosen the feathers thereon preparatory to mechanical picking of the feathers. A common technique for such treatment of fowl has heretofore included hanging the fowl from shackles and dragging the fowl through one or more tanks of hot scalding water. Such techniques have been subject to numerous disadvantages including contamination by accumulated filth and residue from the previous fowl. Such water tanks require repeated cleaning, but still remain ineffective in controlling surface bacteria such as Salmonella, as the so-called scalding water must generally be kept below temperatures of about 140° F. to avoid cooking the poultry. These hot water tanks result in ingestion of contaminated water by the fowl during passage therethrough and leave bacteria on the skin of the fowl which is driven into the meat of the fowl by the mechanical picking fingers subsequently utilized to defeather the fowls.

Even in the face of such well-known deficiencies in the hot water immersion techniques described, such immersion techniques are widely and generally exclusively used in present commercial fowl defeathering and hog dehairing operations.

It has been heretofore proposed to utilize steam for treatment of animal carcasses, and particularly fowl. For instance, U.S. Pats. No. 2,152,082 and No. 2,152,083, granted to Onorato et al. on May 29, 1939, disclose the use of steam upon fowl. Additionally, a fowl defeathering apparatus and method employing a vaporized steam spraying procedure was disclosed in U.S. Pat. No. 2,972,167, granted Feb. 21, 1961, and U.S. Pat. No. 3,074,103, granted Jan. 22, 1963, to Roth et al. Such steam treatment as disclosed in the Roth et al. patents has presented improvements in sanitary feather loosening processes over the standard immersion processes. However, the particular constructions and techniques disclosed by such patents have not been accepted in the fowl processing trade, as such constructions and techniques require substantially modifying existing fowl processing lines and facilities.

In an attempt to overcome the deficiencies of the prior art, an improved fowl processing method and apparatus was developed and disclosed in U.S. Pat. No. 3,561,040, issued Feb. 9, 1971 by Folke K. Floden and assigned to the present assignee. This method and apparatus involves transportation of animal carcasses along a generally U-shaped path inclined at a predetermined angle relative to the horizontal while directing steam spray nozzles at the carcasses and maintaining the temperature within the U-shaped path at a predetermined temperature limit. This method and apparatus has the advantage of being easily inserted in an existing fowl picking line and provides extremely sanitary and efficient loosening of fowl feathers.

However, it has subsequently been found that longer retention times within the vaporizing housing are required in some instances for the proper steam treatment of certain fowls, and in particular poultry. The present invention thus envisions at least four reversing traverses inside an inclined housing to afford a prescribed retention time which has been found to work well in practice. Additionally, prior vaporizing techniques have often had heat stratification problems due to the buildup of heat in a localized area of the housing. The present invention envisions the use of oscillating nozzles which spray oscillating streams of fluid such as liquid or steam within the housing to treat the fowl passing therethrough and to also reduce heat stratification within the housing. The present invention also envisions the use of a line splitter along with an oscillating fluid spray conduit to insure adequate treatment of closely spaced fowl along an overhead conveyor.

It has been also found that certain fowl, such as poultry, have an abdominal cavity existing between the legs or straddle area of the bird. Skin folds also exist where the legs of the bird join with the main body, and therefore, it has heretofore been difficult to adequately remove feathers existing in the abdominal cavity and the skin folds of the straddle area. Additionally, the abdominal cavity has sometimes held water and other fluids during passage through a vaporizing housing, thus allowing the fluid to cool and setting the feathers in this area such that the feathers are difficult to pick. The present invention envisions orienting the body of a bird as it travels through the vaporizing system in such a manner that the straddle area of the bird is exposed to direct sprays of high temperature steam and/or water. Additionally, the abdominal cavity of the bird is so oriented that fluids and excrement are emptied therefrom. This feature additionally assists in placing high temperature steam and other fluids behind the difficult-to-pick wing area of the bird.

SUMMARY OF THE INVENTION

In accordance with the present invention, an enclosed housing is positioned at an angle to the horizontal. A conveyor is supported in the housing to define a predetermined path and carries shackles for suspending fowl in spaced relationships therealong. Spray nozzles extend along the housing on opposed sides of the predetermined path to direct a high temperature spraying medium against the fowl to loosen the feathers and to control bacteria. Oscillating spray nozzles are disposed in the housing for spraying oscillating streams of water and/or steam for treating the fowl and for reducing heat stratification within the housing.

In accordance with another aspect of the invention, a housing is positioned to extend at a predetermined angle to the horizontal which is substantially less than 90°. The lower end of the housing includes admitting and exiting openings and the upper end of the housing is generally enclosed. An overhead conveyor is supported in the housing along a predetermined path along which animals are transported. The predetermined path includes at least four reversing traverses between the lower end of the housing and the upper end of the housing. Spray nozzles are supported on divider walls disposed between the traverses in order to direct high temperature vaporized medium against the animals carried through the housing by the overhead conveyor. The entry of ambient air is selectively regulated into the lower end of the housing in order to create an upward draft within the housing for regulation of the internal temperature therein. The housing has contoured ceiling structure to prevent intense heat buildup in the area of the overhead conveyor and to provide the area of greatest heat buildup in the vicinity of the animals carried by the conveyor.

In accordance with yet another aspect of the invention, an overhead conveyor extends through a housing, with shackles pivotally connected at spaced points along the conveyor for transporting animal carcasses through the housing. A line splitter pivots alternate shackles along the conveyor to a first inclined position and the remaining alternate shackles to a second inclined position. Spray nozzles are disposed beneath the overhead conveyor and are oscillated to alternately direct spray medium against alternate ones of the animal carcasses.

In accordance with another important aspect of the invention, fowl are supported by the leg portions and are transported through an upwardly inclined housing. During travel through the housing, the head portions of the downwardly hanging fowls are elevated to thereby expose the straddle area of the fowl. Spray nozzles subject the exposed straddle areas to a high temperature steam and/or hot water spray. The elevation of the head portions also causes fluids and excrement collected in the abdominal cavity of the fowl to be emptied therefrom.

DESCRIPTION OF THE DRAWINGS

For a more complete understanding of the present invention and for other objects and advantages thereof, reference is now made to the following description taken in conjunction with the accompanying drawings, in which.

DESCRIPTION OF THE PREFERRED EMBODIMENTS

Figure 1:
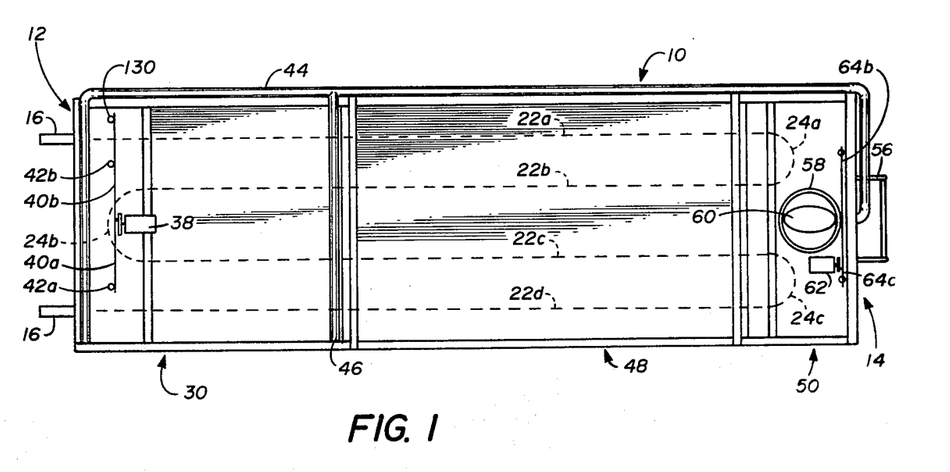
FIG. 1 illustrates a top view of the preferred embodiment of the present vaporizing system.
Figure 2:
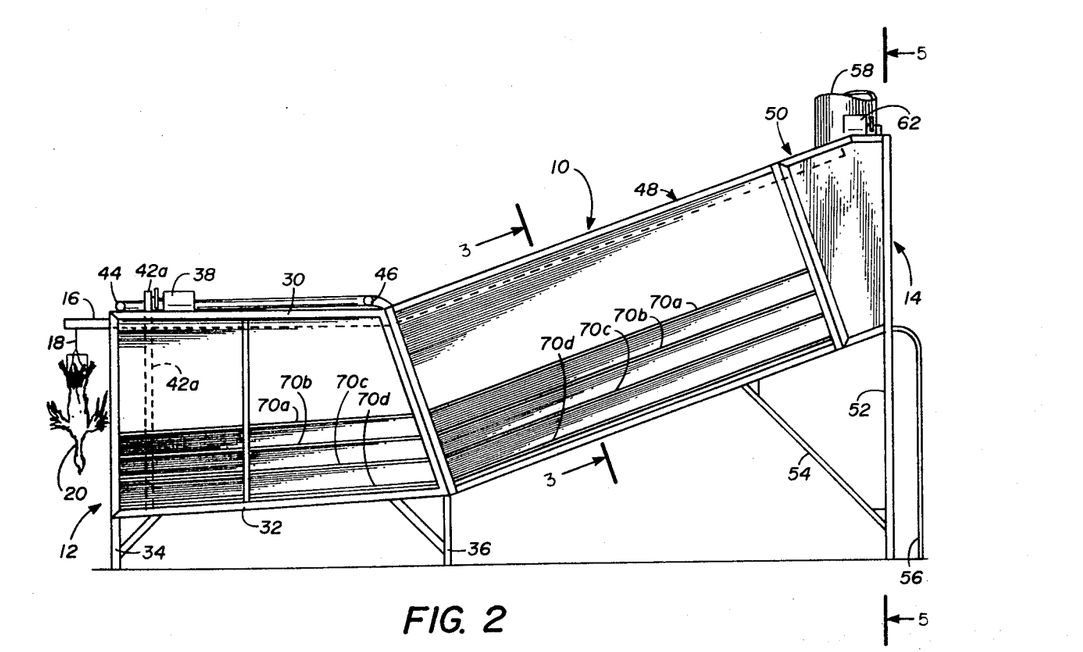
FIG. 2 is an elevational view of the system shown in FIG. 1.

FIGS. 1 and 2 illustrate the upwardly inclined housing of the invention which is designated generally by the numeral 10. Housing 10 comprises a lower end 12 having entrance and exit openings and an upper end 14 which is generally enclosed. A conventional overhead roller chain conveyor 16 extends along a predetermined path through the housing 10. A plurality of shackles 18 are conventionally placed along the length of the conveyor 16 and animal carcasses 20 are suspended from the shackles for movement along the path of the conveyor 10. It will be understood that the present invention is useful for processing of animal carcasses other than fowl, such as for pretreating hog carcasses prior to dehairing treatment. However, in the preferred embodiments, processing of fowl will be hereinafter described for ease of description and illustration. Only carcass 20 is illustrated in FIG. 2 for simplicity of illustration, but it will be understood that a large number of carcasses will be spaced at close intervals along the length of the conveyor 16 within the housing 10 during operation thereof.

The present housing 10 comprises an improvement over the inclined vaporizing housing disclosed in the continuation-in-part application Ser. No. 831,964, previously described and the disclosure of the copending application is herein incorporated in its entirety.

As shown in FIG. 1, the suspended fowls enter housing 10 at the left side of the lower end 12 and are transported upwardly through the housing along the traverse 22a. The fowl then travel around the loop portion 24a and are carried downwardly through the housing via a reversing traverse 22b. The fowl are then carried around the loop 24b and are again carried upwardly through the housing along a reversing traverse 22c. At the upper part of the housing, the fowl are carried about the loop portion 24c and are transported downwardly along the reversing traverse 22d, after which they are exited from the lower portion of the housing and are carried to a conventional feather picking machine.

As shown in FIGS. 1 and 2, the housing 10 comprises an upwardly inclined housing having a generally rectangular cross section throughout the length thereof. A first lower section 30 has a floor 32 which slopes at a slight angle toward the lower end 12. Suitable leg members 34 and 36 support the lower portion 30. A motor 38 has an output shaft which is eccentrically attached to a pair of rods 40a–b which are thus oscillated upon energization of the motor 38. The rods 40a–b are respectively attached to vertically disposed pipes 42a–b which are thus oscillated or reciprocated about the longitudinal axis thereof. As will be later described in detail, a supply of hot water and/or steam is attached to the pipes 42a–b and nozzles are disposed along the length of the pipes 42a–b in order to provide an oscillating spray to the fowl passing around the loop portion 24b.

Hot water and/or steam is provided to the pipes 42a–b via a header 44 which originates at the rear of the housing 10 in a manner to be subsequently described. A steam header 46 extends across the lower portion 30 and is attached to a suitable source of steam in the manner disclosed more fully in copending patent application Ser. No. 831,964. Suitable steam temperature controls and regulating devices, not shown, are disposed on the header 46 in the manner disclosed in the copending application.

An intermediary housing portion 48 is inclined to the horizontal at an angle substantially less than 90° and is connected at the lower end to the lower housing 30. Housing portions 30 and 48 may be connected by welding, or by suitable bolts extending through flanges on the housings. The housing portions are adapted to be separated for ease and storage and shipping.

The inclined nature of the intermediate housing 48 assists in maintaining the desired internal temperature of the housing, as well as enabling the system to be maintained in a sanitary condition. The upper inclination of the intermediate portion 48 may vary between certain preferred limits so long as the angle chosen permits the proper operation of the system, including the creation of a relatively rapid upper flow of ambient air through the housing, as will be described in greater detail.

The inclination chosen is substantially less then vertical so that the housing will conserve floor space, and yet will permit the system to be positioned in buildings having normal height ceilings. Inclination in a range from approximately 3° to approximately 40° relative to the horizontal has been determined as meeting the stated needs and as permitting the apparatus to perform its desired objectives. An inclination falling between within a narrower range of approximately 20° to 35° has been found preferable, with an inclination of approximately 20° being highly effective for insuring close temperature control while permitting the apparatus to conserve floor space, without creating any necessity to alter or raise the roof of a conventional building in which the apparatus is installed. Additionally, such inclination produces the desired results without adjacent fowl contacting each other, and without requiring any modification in the shackle spacing of the conventional overhead conveyor 16.

An upper housing portion 50 is rigidly connected to the intermediate housing portion 48 and is firmly supported by a pedestal 52 and a support brace 54. The overhead conveyor 16 traverses loop portions 24a and 24c within the upper housing 50. A ladder 56 is provided for ease of access to the upper portion 50. A stack 58 opens from the top of the upper portion 50 and includes a damper plate 60 therein. Damper 60 is operable in the manner described in detail in previously identified application Ser. No. 831,964, with a thermostat, not shown, being provided to control the orientation of the damper within the stack 58. As disclosed in the copending patent application, a motor controls the damper 60, such that upon sensing of an undesirable increase in the internal temperature of the housing 10, the damper 60 is opened so that ambient air may enter through the lower end of the housing 10 and exhaust via the stack 58.

In some instances, a fan may be inserted in the stack 58 to induce a forced draft of ambient air through the housing. Such passage of ambient air rapidly reduces the temperature within the housing 10 to any desired level, the desired temperature condition being sensed by the thermostat which then operates the damper 60 to again close stack 58. In such a manner, the internal temperature of the housing 10 may be regulated in an extremely precise manner.

An electric motor 62 has an output shaft which is eccentrically mounted to a pair of rods 64a–b. The rods 64a–b are connected through linkages to elongated spray nozzle conduits in order to spray oscillating sprays of water and/or steam upon the fowl passing along the traverses in a manner to be subsequently described in more detail.

A plurality of steam laterals 70a–c are disposed along the lower portion of the sides of the lower housing portion 30 and the intermediate housing portion 48. The steam laterals extending along the lower housing portion 30 are inclined slightly to the horizontal, while the fowl 20 travels along a generally horizontal path. A high temperature spray medium such as steam is applied to the laterals via the steam header 46. Steam is then applied to the interior of the housing 10 via nozzles connected along the length of the steam laterals 70a–d. If desired, water may be selectively injected into the steam header 46 in order to desuperheat or supersaturate the steam applied to the fowl, in the manner disclosed in the copending application Ser. No. 831,964. The use of wet spray is further emphasized in the invention by the use of selective water and/or steam spray from oscillating pipes within the housing, as will be described in greater detail.

Figure 3:
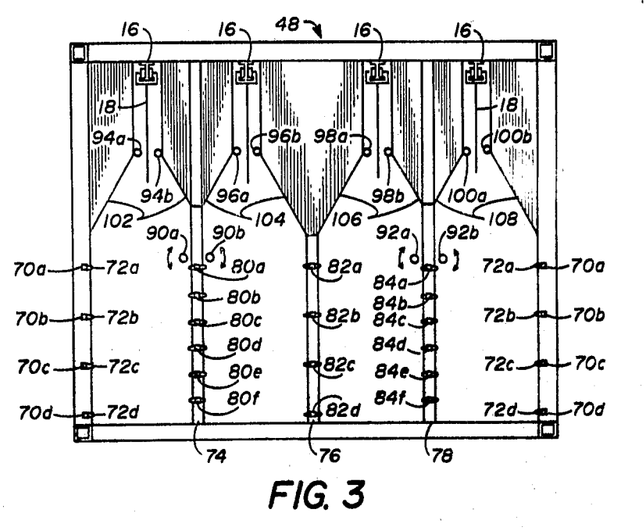
FIG. 3 is a sectional view taken generally along the section lines 3—3 in FIG. 2.

Referring to FIG. 3, a sectional view taken along section lines 3—3 on FIG. 2 is illustrated. The intermediate housing section 48 may be seen to have a generally rectangular cross section formed by elongated beam members, with the sidewalls being formed from sheet metal members. In the preferred embodiment of the invention, the majority of the housing 10 is constructed from stainless steel metal. In some instances, aluminum may be utilized for certain portions of the housing 10. The steam laterals 70a–d are disposed on opposed sides of the intermediate housing section 48, with nozzles 72a–d extending through the sheet metal sidewalls into the interior of the housing. Steam thus issues from the nozzles 72a–d into the housing. A plurality of nozzles are disposed along each of the steam laterals, with spacing of 6 to 8 inches operating well in practice.

Three dividing wall structures 74, 76 and 78 divide the interior of the housing portion 48 into four generally equal portions. The overhead conveyor 16 is disposed above each of the portions along the traverses 22a–d as shown in FIG. 1. Each of the dividing wall portions 74–78 comprise opposed metal wall portions between which are disposed additional steam laterals. Specifically, steam laterals 80a–f are disposed between the dividing wall structure 74, with steam spray nozzles extending from the laterals on opposed sides so as to provide steam spray from both sides of the wall structure 74. Similarly, steam laterals 82a–d are disposed within the dividing wall 76 and steam laterals 84a–f are disposed within the dividing wall 78. Steam nozzles extend from the laterals 82a–b and 84a–f so as to extend from both sides of each of the dividing walls 76 and 78.

In operation, steam is emitted from each of the laterals to provide a high temperature steam atmosphere within the housing 10. Although the illustrated embodiment has been found to provide an excellent source of high temperature steam within the housing, alternate methods of providing steam within the housing 10 are available. For instance, the spray nozzles extending from each of the steam laterals illustrated may be blocked off, with steam being supplied through the laterals. The high temperature steam then heats the interior walls of the housing, such that when water was sprayed upon the walls, steam results to additionally provide the high temperature atmosphere within the housing 10.

The interior walls of the housing 10 are unbroken, with the exception of the spray nozzles extending therefrom. This permits the vaporizing station of the invention to be easily cleaned and maintained in a sanitary condition. If desired, in the preferred embodiment, valves may be adjustable within each of the steam laterals to allow adjustment of the steam pressure within each lateral. For instance, the highest velocity steam may be directed to the area behind the wings of a downwardly hanging fowl, while the lowest velocity steam might be directed against the breast.

An important aspect of the invention is the provision of oscillating water and/or spray conduits 90a–b and 92a–b. The conduits comprise pipes disposed along the length of the intermediate housing section 48 and supplied from a source of hot water and/or steam. In the preferred embodiment, water having a temperature of in the range of 110° F. to 145° F. is supplied from the water header 44 to the pipes 90a–b and 92a–b. Apertures for spray nozzles are disposed along the length of each of the pipes, such that the hot water is sprayed outwardly from the pipes. Oscillation along a selected angle less than 180° is provided to each of the pipes 90a–b and 92a–b such that an oscillating spray of hot water is supplied to the interior of the housing. When the unit is in operation, the hot water impinges upon the fowl being transported therealong. It has been found that the wetting of the fowl assists in the preconditioning of the fowl for picking operations. Importantly, the provision of the oscillating water spray within the housing has also been found to reduce heat stratification within the housing, such that a uniform heat is provided along the length of the housing without hot or cold pockets therein.

Guide bars 94a–b, 96a–b, 98a–b and 100a–b are disposed along the length of the intermediate housing 48 in order to position the shackles hanging from the overhead conveyor 16 in the desired orientation. As described in some detail in the copending application Ser. No. 831,964, these guide bars orient the difficult-to-treat back portion of the fowl such that the back portion is provided with a continuous steam treatment. Additionally, the guide bars may be connected to a source of heated water and may include spray apertures to provide additional water spray within the cabinet.

Another important aspect of the invention is the provision of false ceiling portions 102, 104, 106 and 108 along the length of the housing 10. The false ceiling portions comprise sheet metal lengths which define a narrow opening for the overhead conveyor 16 and allow the passage of the shackles 18 along the length of the housing. The false ceiling portions then slope outwardly and downwardly to provide a larger passageway for the passage of fowl therethrough. The operation of the false ceilings is described in greater detail in the copending patent application Ser. No. 831,964, wherein it is described how the heat concentration within the inclined housing is forced away from the area of the overhead conveyor and down into the vicinity of the fowl. This concentration of heat makes the inclined housing more efficient and provides a hotter environment to the fowl being transported through the housing.

Figure 4:
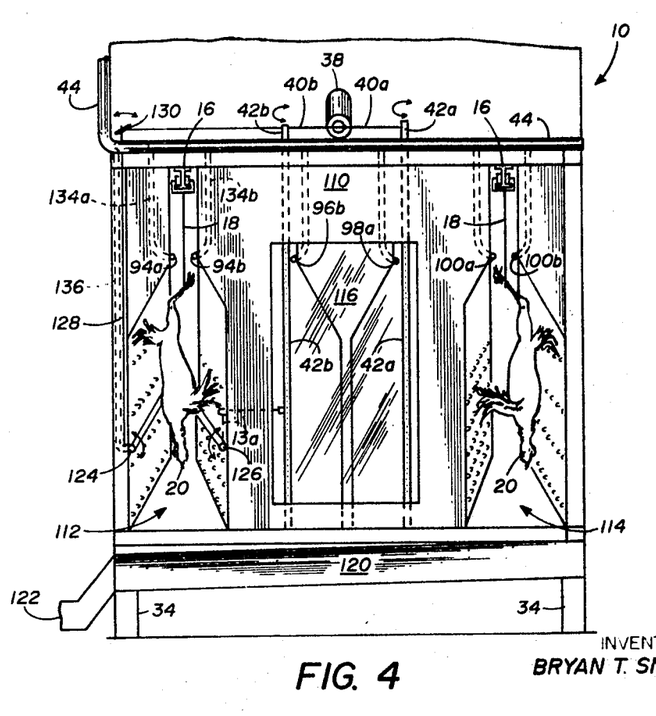
FIG. 4 is a front view of the lower end of the system shown in FIG. 1.

FIG. 4 illustrates the front of the unit shown in FIGS. 1 and 2, wherein it may be seen that a panel of sheet metal 110 extends over the face of the lower housing portion 30, with the exception of an entrance aperture 112 and an exit aperture 114. A transparent door 116 may be used to allow visibility into the center portion of the unit. The fowl 20 are suspended from shackles 18 in the conventional manner and are initially carried by the conveyor 16 through the entrance opening 112 into the housing 10. The fowl 20 is then subjected to steam spray from the nozzles opening from the sidewalls of the chambers in the manner previously described. Moisture and residue from the fowl runs outwardly from the housing into a tray 120 disposed along the front of the housing and via a drain 122 to a waste disposal system.

Hot water is also sprayed upon the fowl from pipes 124 and 126. Pipes 124 and 126 are reciprocated due to the action of the motor 38. Pipe 124 is connected via a vertical linage 128 to an oscillating member 130. Member 130 is connected at rod 40b to the eccentric output of the motor 38. Pipe 126 is connected via linkages 132 to the oscillating pipe 42b. Pipe 42b is reciprocated by the motor 38 in the manner previously described. Pipes 124 and 126 have apertures along the length thereof in order to provide an oscillating hot water and/or steam spray along the length of the housing. Pipes 124 and 126 may be oscillated at different speeds in some embodiments to cause swinging of the birds to allow the total bird to be wet. The preferred oscillation of the pipes is from 40 to 80 cycles per minute.

In some instances, swinging dutch doors may be provided at both the entrance 112 and exit openings 114 of the housing. The guide bars 94a and 94b are connected to the water header 44 via conduits 134a–b. Pipe 124 is connected to receive hot water via conduit 136. Pipe 126 is also supplied with hot water via a conduit, not shown.

The fowl 20 are transported through the inclined housing along the reversing traverses 22a and 22b and are then transported around loop portion 24b behind the transparent door 116. During passage of this loop, the fowl are subjected to hot water and/or steam spray from the pipes 42a–b. The fowl are then carried back up the inclined housing along traverse 22c and then down the housing along traverse 22d, wherein the fowl exit through the exit opening 114 as illustrated. Guide bars 96b and 98a are supplied with water via conduits from the water header 44, as are guide bars 100a–b. The fowl 20 are thus subjected to high temperature steam spray, and in addition to the hot water spray, during the four reversing traverses along the housing 10. The fowl exit from the exit opening 114 in condition for picking of the feathers in a conventional picking machine. It has been found that the high temperature steam treatment provided by the present invention provides improved picking results, as well as a very sterile environment and final product.

The inclination of the vaporizing housing 10 is advantageous as the vaporized steam sprayed from the nozzles within the housing will pass upwardly along the housing toward the stack 58, due to the draft created within the housing. This draft keeps the steam medium moving and prevents formation of hot spots in the housing, without requiring expensive circulation equipment for that purpose. The oscillating hot water and/or steam spray within the housing also tends to eliminate hot spots within the housing. The inclination of the housing also insures that feathers and other debris which are inadvertently carried into the housing with the fowl and which are removed from the fowl by the steam spray, will flow downwardly with condensed liquid toward the lower end of the housing and out the drain 122.

Figure 5:
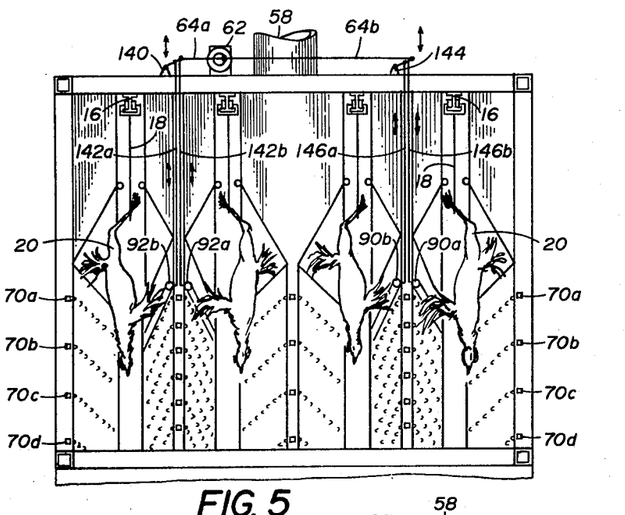
FIG. 5 is a sectional view taken generally along section lines 5—5 in FIG. 2.

FIG. 5 illustrates a view of the system taken along section lines 5—5 in FIG. 2. This view of the present housing looking downwardly along the inclined intermediate housing portion 48 illustrates that the fowl transported through the housing receive a temperature steam spray on all surfaces thereof. It will be seen that the fowl 20 are maintained with the back portions thereof in a predetermined position throughout the length of travel through the housing due to the guide bars positioned within the false ceilings of the unit. The fowl enter the housing 10 at a prescribed position due to the use of a conventional automatic killing machine which disposes each bird along the shackles at a prescribed identical position. Only four fowl have been illustrated in FIG. 5 for ease of illustration, although it will be understood that a plurality of fowl will be disposed along the length of the overhead conveyor throughout the housing during operation. Certain of the numbers to elements in FIG. 5 have been omitted for clarity of illustration.

The operation of the motor 62 will become apparent from FIG. 5. The output of the motor 62 is eccentrically connected to the rods 64a–b. The end of rod 64a is connected to a pivoted member attached to the stationary pivot point 140. The end of rod 64a is also connected to a pair of downwardly disposed rods 142a–b. The end of rod 142a is pivotally connected to a conduit 92b, while the end of rod 142b is pivotally connected to the end of conduit 92a. Operation of the motor 92 then causes vertical oscillation of the rods 142a–b to cause oscillation about a prescribed angle for the conduits 92a–b, thereby providing an oscillating spray of hot water and/or steam upon the fowl passing thereby. Conduits 92a–b are connected to the source of hot water via the hot water and/or steam header 44. The end of rod 64b is pivoted about a stationary pivot point 144 and is connected to a pair of downwardly disposed rods 146a–b. The lower end of rod 146a is pivotally connected to pipe 90b, while the lower end of rod 146b is pivotally connected to the pipe 90a. Operation of the electric motor 62 causes vertical oscillation of the rods 146a–b to cause oscillation of the pipes 90a–b in order to direct an oscillating hot water and/or steam spray upon the fowls 20.

Figure 6:
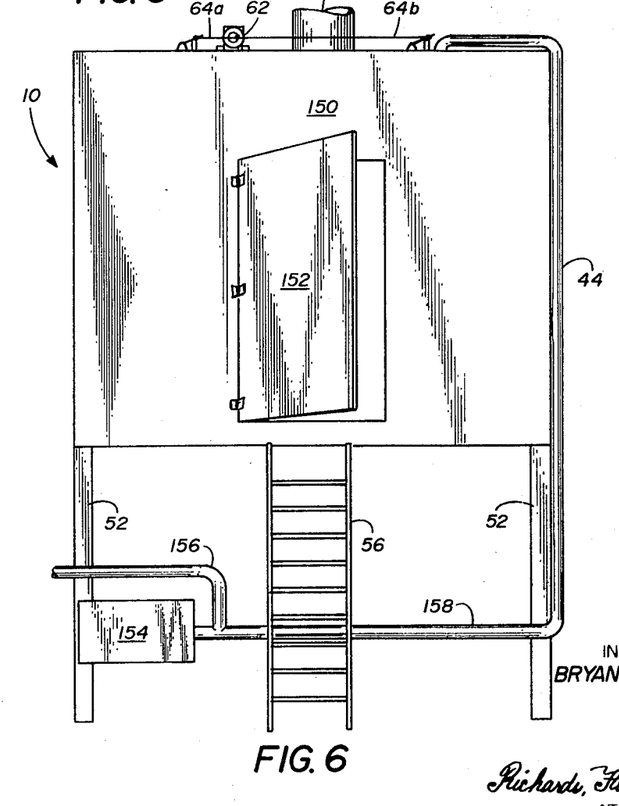
FIG. 6 is a rear view of the elevated portion of the system shown in FIG. 1.

FIG. 6 illustrates the rear view of the housing 10. The rear of the housing 10 is substantially closed by a sheet metal panel 150, with the exception of a door 152 which may be opened for access within the upper portion of the housing. The ladder 56 enables maintenance operators access to the door 152. A water pump 154 is mounted on the lower portion of pedestal 52. A source of heated water is supplied to the pump 154 via an inlet 156, after which pressurized water is supplied via the pipe 158 to the header 44 and to the spray conduits within the housing previously described. In some instances, steam may be used in place of the water or in conjunction with the water.

Figure 7:
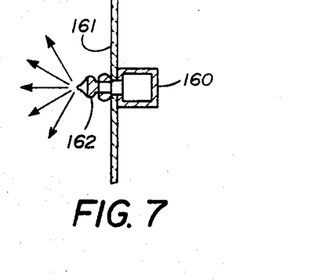
FIG. 7 is an enlarged sectional view of one of the spray nozzles in the present system.

FIG. 7 illustrates a typical steam lateral 160 for use with the invention. The lateral 160 is attached to a stainless steel wall 161 and a spray nozzle 162 extends through the wall 162 for admission of high pressure steam. The advantage of placing the steam lateral 160 on the opposite side of the wall 161 from the spray nozzle 162 is that a relatively smooth unbroken surface is provided within the housing to facilitate cleanup and sanitary conditions.

It should be understood that the present invention encompasses exiting the fowl from the inclined housing after passing along traverses 22a–b and then subjecting the fowl to conventional picking operations outside the housing. The fowl would then be conveyed back to the inclined housing for passage along traverses 22c–d and then exit from the housing for final picking operations. Additionally, if desired, picking operations could be conducted in the first lower section 30 in the region of loop portion 24b.

Figure 8:
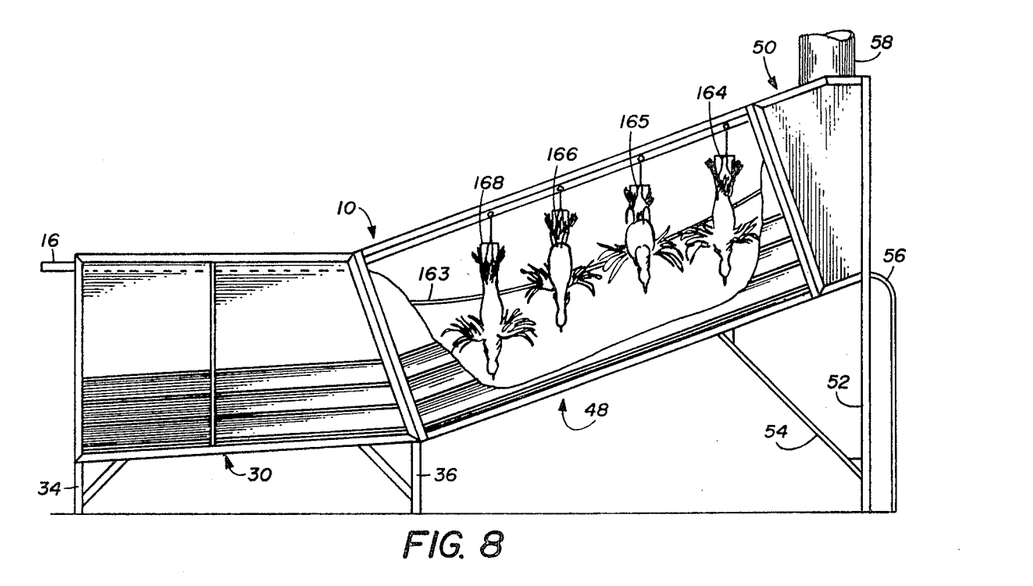
FIG. 8 is an elevational view, partially broken away, of another embodiment of the invention.
Figure 9:
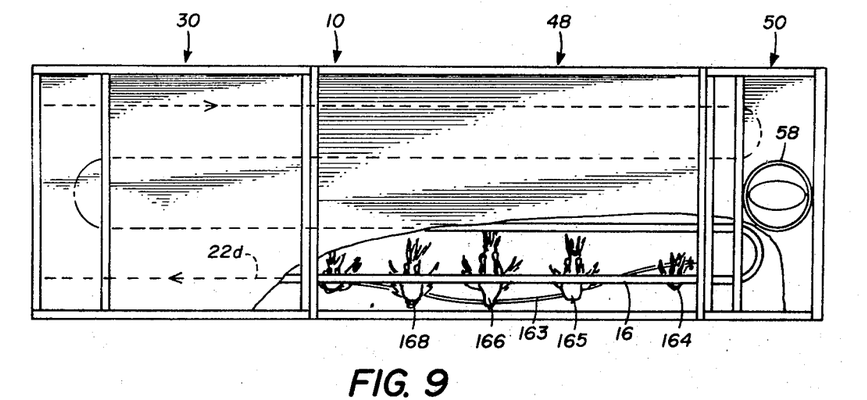
FIG. 9 is a top view, partially broken away, of the system shown in FIG. 8.
Figure 10:
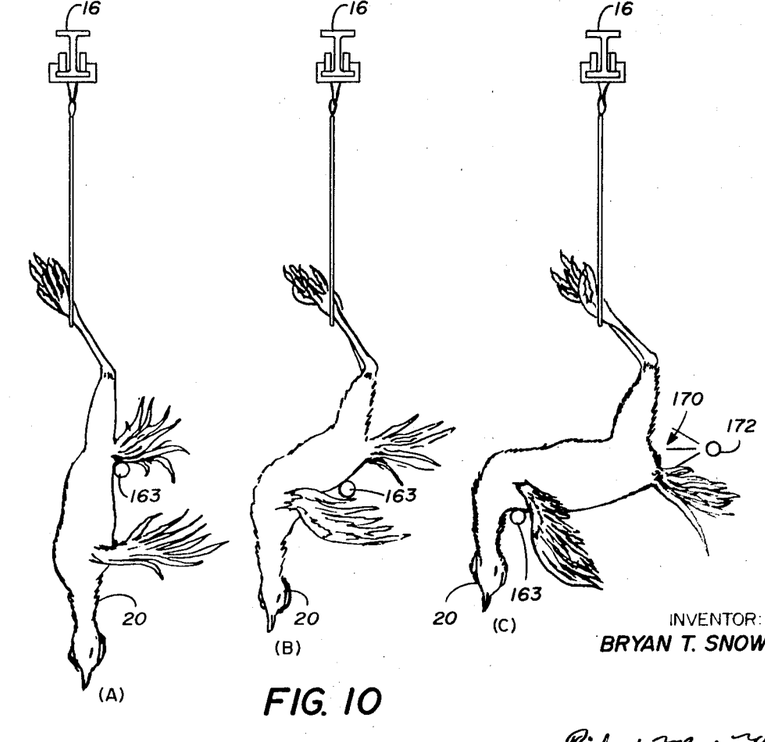
FIGS. 10a–c are somewhat diagrammatic illustrations of the position of fowls in various stages of progression through the system shown in FIGS. 8 and 9.

FIGS. 8–10 illustrate another important aspect of the invention wherein the straddle areas of a fowl may be exposed and treated with high pressure steam and/or water. It is known that the straddle area of fowl is extremely difficult to properly pick, due to the fact of the existence of skin folds wherein the legs of the fowl join with the body. Feathers are thus often left in the skin folds within the straddle area of a fowl. Additionally, in the vicinity of the straddle areas, abdominal cavities sometimes exist in certain fowl, such cavities tending to hold water and cool it in a steam atmosphere. This cooling may allow feathers to "set" in this area and make picking in the straddle area or abdominal area difficult.

The present invention thus envisions tipping or reorienting the fowl such that the straddle area of the bird directly faces high pressure steam and/or water nozzles for treatment thereof. Additionally, the reorientation of the bird empties water and other accumulated liquids such as excrement from within any abdominal cavity of the bird. The present invention also envisions placing additional steam and water behind the wings of the bird during the reorientation to facilitate picking in this troublesome spot.

The preferred embodiment of the invention utilizes an elongated curved bar 163 along one traverse of the housing 10 to elevate the head of the bird to thereby expose the straddle area of the bird. Referring to FIG. 8, the housing 10 is illustrated with like numbers being utilized for like and corresponding parts previously described. On the last reversing traverse 22d of the fowl within the housing, the fowl begin to come in contact with the curved bar 163 at the position illustrated by fowl 164. As the fowl are carried downwardly along the intermediate housing 48, the bar 163 curves outwardly and tends to elevate the head of the fowl.

At the position illustrated by fowl 165, the head portion of the fowl has been substantially elevated to expose the straddle area of the fowl for reception of a high temperature steam and/or water spray. Additionally, the abdominal cavity of the fowl has been emptied of liquid. The curved bar 163 then begins to curve back inwardly toward the traverse 22d and begins to release the fowl, such that at the position shown by fowl 166, the head portion of the fowl is again lower than the feet and straddle area. At the position illustrated by fowl 168, the fowl again hangs straight downwardly and contact with the bar 163 is terminated. The fowl are then carried outwardly from the exit of the housing in the manner previously described.

FIG. 10 illustrates with clarity the operation of the bar 163 at various stages along the intermediate housing member 48. At the position shown in FIG. 10a, the fowl 20 is hanging vertically from the shackle which is attached in the conventional manner to the overhead conveyor 16. At this location, which corresponds generally with the location of fowl 164 in FIGS. 8 and 9, the bar 163 is generally to the right hand side of the overhead conveyor 16.

As the fowl 20 continues downwardly from the inclined housing, the bar 163 begins to curve beneath the overhead conveyor 16 and tends to pivot or hinge the fowl 20 at the junction between the leg portions and the body of the fowl. The bar 163 continues to curve beneath the overhead conveyor 16, until at the position shown in FIG. 10c, the bar 163 has crossed over to the lefthand side of the overhead conveyor 16 and has elevated the head area of the fowl. The straddle area generally identified by numeral 170 is thus exposed to a spray nozzle 172 which applies high temperature steam and/or water to the exposed straddle area. The abdominal cavity of the fowl 20 has also been emptied of liquid in the illustrated position. This position corresponds to the position of the fowl 165 in FIG. 9. The bar 163 then begins to curve back underneath the overhead conveyor 116, as shown in FIG. 9, and the fowl 20 is released.

It has been found that the orientation of the fowl such that the head and feet portions are elevated above the straddle area exposes the straddle area sufficiently that a high temperature steam and/0r water spray very thoroughly treats the straddle area of the fowl for subsequent picking. Water may be introduced into bar 163 and sprayed from apertures therein to wet the birds, to lubricate the bar to make the birds slide therealong, and to assist in cleaning the bar.

Figure 11:
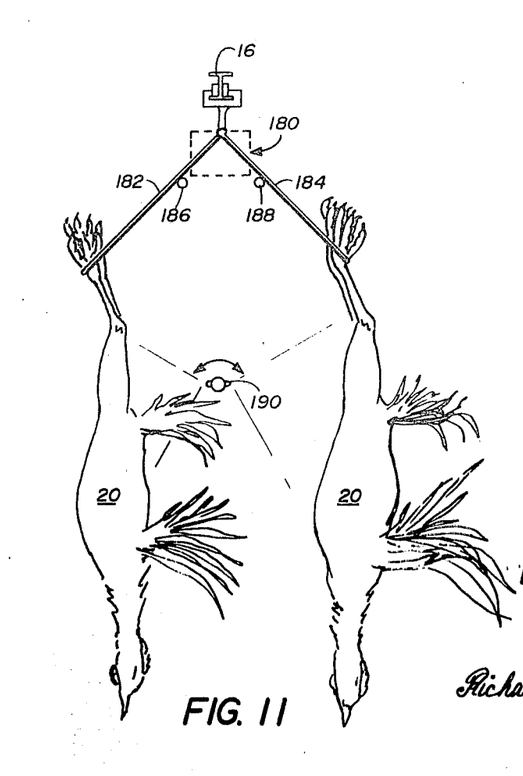
FIG. 11 is a somewhat diagrammatic view of the use of a line splitter and oscillating spray nozzle in the present invention.

FIG. 11 illustrates yet another important aspect of the invention. The overhead conveyor 16 passes over a conventional line splitter denoted generally by numeral 180. THe line splitter 180 is commercially available and generally includes a pivoted finger which inclines first one shackle member 182 to a first position and then the next proceeding alternate shackle 184 to a second opposed inclined position. After passing through the line splitter 180, the shackle 182 abuts an elongated rod 186 for maintenance in the first inclined position. After passing the line splitter 180, the alternate shackles 184 abut with elongated rod 188 for maintenance in the second inclined position. The alternate fowl 20 spaced along the overhead conveyor 16 are thus inclined away from each other on opposite sides of an oscillating spray nozzle 190.

Spray nozzle 190 may comprise an elongated conduit oscillated in a manner previously described from an eccentric motor output shaft. The alternate inclining of adjacent fowl according to the structure shown in FIG. 11 has been found to allow close spacing of fowl while yet insuring adequate fluid or steam spray to the bodies of the fowl, The oscillating action of the steam and/or water spray nozzles 190 is to wet the entire body of the fowl and also cause swinging of the bodies of the fowl to insure further coverage of the bodies of the fowl.

It will be understood that while the present invention has been disclosed as useful for pretreatment of fowl prior to picking, the present apparatus may in some instances be utilized for cooking of food such as fowl or the like. In the cooking operation, the speed of the overhead conveyor is slowed down for longer retention time within the steam filled inclined housing. The use of the present system for cooking yields improved weight yields without substantial loss of moisture. The present invention is thus particularly advantageous for inline cooking, wherein batch cooking is impractical or not advantageous.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. Apparatus for treatment of fowl comprising:
    a housing,
    means for supporting the fowl by the leg portions and transporting the downwardly hanging fowl through said housing,
    means for elevating the head portions of the fowl to thereby expose the straddle area of the fowl, and
    means for subjecting the exposed straddle areas to a high temperature fluid spray.

2. The apparatus of claim 1 and further comprising:
    a stationary elongated member mounted within said housing and engageable with the moving fowl to thereby elevate the head portions of the fowl.

3. The apparatus of claim 1 wherein said housing is inclined at an angle to the horizontal, and means is provided to induce drafts of air upwardly through said housing to reduce heat stratification.

4. A vaporizing spray apparatus for treatment of fowl comprising:
    a housing positioned to extend at a predetermined angle to the horizontal which is substantially less than 90°, the lower end of said housing having admitting and exiting openings and the upper end of said housing being enclosed,
    an overhead conveyor supported in and extending through said housing along a predetermined path along which the fowl are carried, said predetermined path including at least four reversing traverses between the lower end of said housing and the upper end of said housing,
    divider walls disposed between adjacent ones of said traverses,
    means supported on said divider walls for directing a high temperature vaporized medium against the fowl carried through the said housing by said conveyor,
    means for selectively permitting and regulating entry of ambient air into the lower end of said housing and to create an upward draft therein for regulation of the internal temperature of said housing,
    walls disposed within the upper portion of said housing to prevent intense heat build-up in the area of said overhead conveyor and to provide the area of greatest heat build-up in the vicinity of the fowl below said overhead conveyor,
    elongated conduits horizontally disposed along opposite sides of at least one of said traverses,
    said conduits having apertures formed along the length thereof,
    means for pivotally mounting said conduits for rotation about the longitudinal axis thereof,
    motor means mounted on said housing,
    linkage connecting the output of said motor to said conduits to oscillate said conduits about their longitudinal axes, and
    means for supplying fluid to said conduits such that an oscillating fluid spray is applied to said fowl as they pass between said conduits.

5. The spray apparatus of claim 4 and further comprising:
    means for operating said motor means to oscillate said conduits in the range of 40–80 cycles per second.

6. The vaporizing spray apparatus of claim 4 and further comprising:

at least one vertically disposed conduit disposed at the upper end of said housing in the region of the reversing portion of a pair of said traverses, said conduit having apertures disposed along the length thereof, motor means connected to a linkage for oscillating said vertically disposed conduit, and means for supplying water to said conduit for spraying from said apertures.

* * * * *